United States Patent
Friedrich

(10) Patent No.: US 11,658,359 B2
(45) Date of Patent: May 23, 2023

(54) BATTERY DEVICE WITH IMMERSION COOLING AND MOTOR VEHICLE

(71) Applicant: Bayerische Motoren Werke Aktiengesellschaft, Munich (DE)

(72) Inventor: Thomas Friedrich, Woerthsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/860,490

(22) Filed: Jul. 8, 2022

(65) Prior Publication Data

US 2023/0017464 A1 Jan. 19, 2023

(30) Foreign Application Priority Data

Jul. 9, 2021 (DE) .................. 10 2021 117 747.2

(51) Int. Cl.

| | |
|---|---|
| *H01M 10/6568* | (2014.01) |
| *H01M 50/204* | (2021.01) |
| *H01M 50/249* | (2021.01) |
| *H01M 10/613* | (2014.01) |
| *H01M 10/625* | (2014.01) |
| *H01M 10/653* | (2014.01) |
| *H01M 10/6556* | (2014.01) |
| *B60L 58/26* | (2019.01) |
| *B60L 50/60* | (2019.01) |
| *H01M 10/6561* | (2014.01) |

(52) U.S. Cl.
CPC ......... *H01M 10/6568* (2015.04); *B60L 50/60* (2019.02); *B60L 58/26* (2019.02); *H01M 10/613* (2015.04); *H01M 10/625* (2015.04); *H01M 10/653* (2015.04); *H01M 10/6556* (2015.04); *H01M 10/6561* (2015.04); *H01M 50/204* (2021.01); *H01M 50/249* (2021.01); *H01M 2220/20* (2013.01)

(58) Field of Classification Search
CPC ........... H01M 10/6568; H01M 10/613; H01M 10/625; H01M 10/653; H01M 10/6556; H01M 10/6561; H01M 50/204; H01M 50/249; H01M 2220/20; B60L 50/60; B60L 58/26

See application file for complete search history.

(56) References Cited

U.S. PATENT DOCUMENTS

| | | | |
|---|---|---|---|
| 2008/0135636 A1* | 6/2008 | Sakai .................. | F24D 11/0214 237/2 B |
| 2010/0104927 A1* | 4/2010 | Albright ............... | B60L 3/0069 429/50 |
| 2012/0003510 A1* | 1/2012 | Eisenhour ........... | H01M 10/625 429/50 |
| 2016/0197384 A1* | 7/2016 | DeKeuster ........ | H01M 10/6551 429/120 |
| 2017/0341632 A1* | 11/2017 | Han ....................... | F04B 17/03 |
| 2019/0067763 A1* | 2/2019 | Ing ...................... | H01M 10/613 |
| 2022/0123383 A1* | 4/2022 | Lee ....................... | H01M 50/262 |
| 2022/0131209 A1* | 4/2022 | Bartling .............. | H01M 10/653 |
| 2022/0151097 A1* | 5/2022 | McManis ........... | H05K 7/20781 |

FOREIGN PATENT DOCUMENTS

| | | |
|---|---|---|
| DE | 10 2007 045 183 A1 | 4/2009 |
| DE | 10 2018 210 646 A1 | 1/2020 |
| DE | 10 2018 133 004 A1 | 6/2020 |
| DE | 10 2018 133 006 A1 | 6/2020 |

OTHER PUBLICATIONS

German-language Search Report issued in German Application No. 10 2021 117 747.2 dated Jan. 19, 2022 with partial English translation (10 pages).

\* cited by examiner

*Primary Examiner* — Muhammad S Siddiquee
(74) *Attorney, Agent, or Firm* — Crowell & Moring LLP

(57) ABSTRACT

A battery device has a battery housing, a plurality of battery cells arranged therein, around which a dielectric thermal management medium can flow in the battery housing at least in some areas in an immersion circuit inside the battery for the purpose of immersion thermal management, and thermally conductive elements. The thermally conductive elements are each arranged between two adjacent battery cells which each bear with at least one side against the respective thermally conductive element in thermally conductive contact with the latter. The thermally conductive elements here project in at least one direction beyond the battery cells and through a housing wall of the battery housing to the outside. The thermal management medium can likewise flow around those sections of the thermally conductive elements running from the battery cells to the corresponding housing wall.

10 Claims, 1 Drawing Sheet

BATTERY DEVICE WITH IMMERSION COOLING AND MOTOR VEHICLE

CROSS REFERENCE TO RELATED APPLICATION

This application claims priority under 35 U.S.C. § 119 from German Patent Application No. 10 2021 117 747.2, filed Jul. 9, 2021, the entire disclosure of which is herein expressly incorporated by reference.

BACKGROUND AND SUMMARY OF THE INVENTION

The present invention relates to a battery device for a motor vehicle and to a motor vehicle with such a battery device.

Batteries are currently used in many different fields. Ever greater demands are here being placed on batteries, for example with regard to the highest possible energy and power density, the lowest possible space requirement, the lowest possible costs, the longest possible life, and the like. A decisive factor can here be effective and efficient thermal management of the battery or the battery cells of the battery. Thus, in the case of the battery cells which are widely used today, for example, maximum power output and input are typically provided only within a limited temperature range, and temperature gradients inside the battery and the battery cells can cause undesired accelerated or non-uniform damage to the battery cells.

DE 10 2018 133 006 A1 discloses, for example, an electrical storage means which is suitable for automotive applications and is thus intended to have the highest possible storage density and be as mechanically robust as possible. For this purpose, a housing of the electrical storage means has a sandwich construction and has three layers, namely a top covering layer which forms a cover of the housing, a bottom covering layer which forms a base of the housing, and a core layer arranged between them. A plurality of cross members, which are each connected rigidly to the two covering layers, are arranged in the core layer as structural elements. The cross members here form, in the core layer, one or more compartments in which cells of the electrical storage means are arranged and fixed.

An approach for improving the thermal management of an electrical storage means is described in DE 10 2018 133 004 A1. The electrical storage means described therein has a housing and at least one cell arranged therein. A spacer here bears against a cell wall of the cell. The housing is designed so that a dielectric thermal medium flows through it for the purpose of thermal management of the cell. The spacer here forms, together with the cell wall, a flow duct for the thermal medium such that the latter can be conveyed through the flow duct in a direction of flow for the purpose of heat transfer with the cell, in contact with the latter. It is intended that optimally homogeneous and energy-efficient thermal management of the electrical storage means is thus obtained.

As a further approach, a thermally managed battery device is described in DE 10 2007 045 183 A1. The battery device here has a battery and at least one heating and/or cooling device which thermally manages the battery. The battery, immersed in a heating and/or cooling medium, is here arranged in an enclosure accommodating the latter. It is intended that such a battery device can be used within a very wide temperature range.

The object of the present invention is to enable efficient thermal management of a battery device in a particularly simple and efficient manner.

This object is achieved according to the invention by the subjects of the independent patent claims. Possible embodiments and developments of the present invention are disclosed in the dependent patent claims, in the description, and in the drawings.

The battery device according to the invention can in particular be provided for use in a motor vehicle. The battery device can in particular be or comprise a traction battery for a motor vehicle. The battery device according to the invention has a battery housing and a plurality of battery cells arranged therein. The battery device is configured for immersion cooling. For this purpose, a dielectric thermal management medium can flow around the battery cells in the battery housing at least in some areas in an immersion circuit inside the battery. In other words, the thermal management medium can flow around or over the battery cells at least in some areas both in a ready-to-use state of the battery device and when the battery device is ultimately in operation. The thermal management medium can here in particular come into direct or immediate contact with the battery cells, for example the outer sides or cell housings of the latter. From an electrical point of view, this is readily possible here because the thermal management medium is a dielectric medium and hence electrically non-conductive such that it does not, for example, cause a short-circuit of the battery cells around which it flows or washes.

According to the invention, the battery device faces the thermally conductive elements which are each arranged between two adjacent battery cells. The battery cells here each bear with at least one side against the respective thermally conductive element in thermally conductive contact with the respective thermally conductive element. According to the invention, it is provided that the thermally conductive elements project in at least one direction, i.e. for example on at least one side of the battery cells, beyond the battery cells and through a housing wall of the battery housing to the outside, i.e. as far as outside the actual battery housing. The thermal management medium can here also flow around parts or sections of the thermally conductive elements which project beyond the battery cells and run from the latter to the housing wall or its inner side. In other words, in the immersion circuit inside the battery, the thermal management medium thus washes around, i.e. flows around or over in the ready-to-use state of the battery device or when the latter is in operation, both at least regions or parts, for example at least one side or wall, of the battery cells and also at least parts or regions of the thermally conductive elements.

The fact that the battery device has an immersion circuit inside the battery or is configured for this can here mean that the thermal management medium circulates inside the battery housing, i.e. follows a corresponding flow path inside the battery housing. Along this flow path, the thermal management medium then flows along the battery cells and the sections of the thermally conductive elements which are inside the housing.

The thermal management medium can, as already indicated, be a dielectric, i.e. an electrically insulating or electrically non-conductive fluid or the like. Depending on the use case or requirements, different fluids or substances can be used for or as the thermal management medium such as, for example, hydrofluoroether, isoparaffin, demineralized water, oil, and/or the like.

The immersion thermal management provided here already has advantages in terms of thermal management of the battery cells compared with other cooling methods, for example a conventional cooling plate on an underside of the housing. Thus, the thermal management medium can, as described, flow directly along the battery cells. Direct contact, possibly over a particularly large area, of the thermal management medium with the battery cells, and hence particularly effective and uniform thermal management of the battery cells, is enabled by it being possible for heat to be exchanged between the thermal management medium and the battery cells, or the outer sides of the latter around which it flows. In addition, a cost saving can thus be made in components and/or materials such as, for example, lines, corresponding guides or fasteners, and/or the like.

There can, however, be cases where the battery cells need to be packed or pressed together particularly tightly. This can be the case, for example, when pouch cells are used in order to prevent or limit the inflation of the pouch cells or in order to obtain a particularly high energy density of the battery device. In such cases, the thermal management medium cannot flow around or over facing sides or faces of adjacent battery cells or cannot do so with a sufficiently large volume flow, as a result of which the effectiveness of the immersion thermal management by means of the thermal management medium can be limited and possibly undesired temperature gradients could occur inside the battery cells.

The present invention overcomes this problem by the arrangement and design of the thermally conductive elements proposed here. Because the thermally conductive elements bear flat against the battery cells, the thermally conductive elements can enable effective heat transfer from or to the battery cells. In particular, heat can be transferred from the battery cells by the thermally conductive elements in the said direction in which the thermally conductive elements project beyond the battery cells. This heat can be emitted particularly effectively to the thermal management medium via the sections of the thermally conductive elements inside the housing because the thermal management medium can flow around these sections, in particular over their whole area, for the purpose of immersion thermal management. Because the thermally conductive elements project, in particular as a single piece, i.e. continuously, as far as the outside of the battery housing, the heat transfer can be further improved. Thus, the heat can be radiated or emitted at the sections of the thermally conductive elements inside the housing, for example, to the surroundings of the battery device without in so doing crossing a component boundary which typically acts as thermal resistance. The proportion of heat transferred in this way is then therefore not transferred back into the battery cells via the thermal management medium inside the housing. A heating mode, in which the heat flows or is transferred in the opposite direction, can also be provided instead of such a cooling mode.

The thermally conductive elements can be formed from a material which is a particularly good conductor of heat in order to increase the cell thermal management capacity provided by them. For example, the thermally conductive elements can be formed from a metal material such as, for example, aluminum, copper, or steel, or from a thermally conductive, for example graphite-containing, plastic material.

The thermally conductive elements can be plate-shaped or rod-shaped, for example depending on the type or forms of the battery cells. Particularly large-area contact with the battery cells can be achieved by plate-like thermally conductive elements, i.e. thermally conductive sheets, in particular when prismatic battery cells or pouch cells are used. When cylindrical round cells are used, the thermally conductive elements can, for example, also be plate-shaped, but corrugated in this case, such that in each case one round cell can be arranged in corresponding troughs, i.e. indentations of the thermally conductive elements, in order to obtain the largest possible contact area with outer surfaces of the battery cells. The thermally conductive elements can also have a rod-shaped design, for example with an at least essentially triangular cross-section with concavely rounded side faces. In the case of the tightest packing of the cylindrical round cells, the thermally conductive elements can thus be arranged in gaps remaining between the round cells such that the thermally conductive elements bear against a correspondingly rounded outer side of a battery cell with in each case one of its three concave side faces.

By virtue of the embodiments of the thermally conductive elements which are described here, the improved thermal management potential enabled or supplied by them can be used or utilized in a manner which takes up a particularly small amount of structural space.

The said direction in which the thermally conductive elements project beyond the battery cells and through the housing wall, i.e. from the battery housing, can be chosen freely such that the battery device according to the invention can be adapted to different structural space situations or environmental conditions as required.

For improved thermal management capacity, the thermally conductive elements can project beyond the battery cells, for example in two or more directions. The thermally conductive elements can here project through the respective housing wall, arranged in this direction, of the battery housing in just one, several, or all these directions. In other words, it can be provided that, although the thermally conductive elements project beyond the battery cells inside the housing in at least one direction, they do not project through that housing wall of the battery housing which is arranged in this direction or is nearest. The heat transfer by the thermally conductive elements to or from the thermal management medium can thus be improved without requiring additional structural space in the corresponding direction outside the battery housing.

Those sections of the thermally conductive elements which are inside the housing, i.e. project from the battery housing, can, for example, project or be guided outside the battery device as far as a flow region or air duct. This can enable effective thermal management of the battery device, in particular the battery cells, for example even when the battery housing itself cannot be arranged in the corresponding flow region or air duct, for example because of corresponding structural space restrictions or packaging requirements.

Because the thermally conductive elements afford or supply additional thermal management potential, less thermal management medium can, for example, be used, the battery housing can accordingly have a smaller form, a less powerful conveying or circulating device can be used for the thermal management medium, and/or the like. The present invention therefore offers the possibility of reducing complexity, material, costs, structural space requirements, and/or the like.

In order to achieve effective thermal management by means of the thermal management medium, a defined flow path can be formed in the battery housing which the thermal management medium must follow. For this purpose, for example an inflow or upstream region and an outflow or downstream region can be formed in the battery housing which are connected to each other by flow ducts which run along the battery cells and/or the thermally conductive elements. A seal or barrier can be arranged outside these flow ducts, between the inflow or upstream region and the outflow or downstream region, for example as far as a connecting return channel. In this way, it can be ensured that the thermal management medium has to flow along the battery cells and/or the thermally conductive elements in order to pass from the inflow or upstream region to the outflow or downstream region during circulation in the immersion circuit inside the battery. As explained in detail elsewhere, the inflow or upstream region can be connected to the outflow or downstream region via a heat exchanger through which the thermal management medium can flow. For this purpose, in each case one connector or opening of the heat exchanger can, for example, be arranged in the inflow or upstream region and in the outflow or downstream region. The said return duct can then be formed by the heat exchanger or run through the heat exchanger or in the heat exchanger. As a result, the formation of uncontrolled flows or flow paths of the thermal management medium inside the battery housing can be prevented. This enables particularly consistent and predictable thermal management of the battery cells.

In order to harmonize, i.e. homogenize, the flow or thermal management capacity of the thermal management medium in different regions inside the battery housing, i.e. for or at different battery cells and/or thermally conductive elements, a pressure loss element can be arranged in the inflow or upstream region, in the outflow or downstream region, and/or between the battery cells, and/or between the thermally conductive elements, i.e. in the said flow ducts. Such a pressure loss element can represent a predetermined flow resistance for the thermal management medium. In particular, the pressure loss element can here be designed as non-homogeneous or asymmetrical such that it can have flow resistances for the thermal management medium which differ over its extent and in different regions inside the battery housing. For example, the flow resistance of the pressure loss element can decrease the greater the distance from the heat exchanger. As a result, a particularly uniform thermal management capacity of all the battery cells and/or thermally conductive elements inside the battery housing can be achieved.

In one possible embodiment of the present invention, the battery device has, in addition to the thermally conductive elements, a heat exchanger through which the thermal management medium can flow and a pump for conveying the thermal management medium through the immersion circuit. In other words, the thermal management medium is thus forced, during the operation of the battery device, by means of the pump through flow paths which lead through the heat exchanger and along the battery cells and/or the thermally conductive elements. The heat exchanger can, for example, be an air heat exchanger or an evaporator and be connected to an external thermal circuit, i.e. a cooling or heating circuit, in order to exchange heat internally between the immersion circuit and the external thermal circuit, and/or the like. In the embodiment proposed here of the present invention, at least the heat exchanger, the pump, and the battery housing, in particular all the components of the battery device according to the invention, form a compact unit. In other words, these components are therefore integrated or combined into a compact assembly. For this purpose, at least the heat exchanger and the pump can be arranged in or on the battery housing such that they do not form separate parts of the battery device which are connected, for example, only by cables, hoses, or lines and are spaced apart from the battery housing.

By virtue of the compact embodiment proposed here of the battery device, the immersion circuit can be formed completely or at least largely internally, i.e. inside the battery device itself. Fluid guides for the thermal management medium such as those which are, for example, often provided in conventional embodiments in the form of lines leading to a heat exchanger spaced apart from the actual battery housing can thus be omitted completely or at least largely. Corresponding components and the accompanying space requirement and costs can thus be reduced. In addition, an overall pressure loss inside the immersion circuit can thus be minimized, as a result of which, for example, the pump can have a particularly low-power design. This can not only likewise entail corresponding cost and structural space savings but also result in a correspondingly lower demand on a power supply, for example of an onboard electrical system of a respective motor vehicle equipped with the battery device according to the invention. At the same time, there can be a saving in complex seals of fluid guides and the risk of leaks can be minimized.

Likewise, by virtue of the compact arrangement of the components, their electrical connection or electrical supply can be effected particularly simply and with particularly short lines. By virtue of the embodiment of the battery device as a compact unit, the latter can additionally be handled or mounted more simply, for example when installed in the motor vehicle. Likewise, the compact embodiment of the battery device in a particularly simple manner enables compatibility with prior modular systems, in particular when the components, in particular the heat exchanger and the pump, are arranged inside the housing. For example, processes and/or components which are used in prior battery devices without immersion thermal management can thus be maintained completely or partially.

In a possible development of the present invention, the heat exchanger is accordingly arranged inside the battery housing. In particular, the heat exchanger can be arranged, i.e. for example fastened or held, on an inner side, i.e. a side facing the housing interior or the battery cells, of an outer wall of the battery housing. This can enable particularly simple connection of the heat exchanger, for example, to an external thermal circuit. In addition, the arrangement proposed here of the heat exchanger can readily enable or assist an additional, particularly effective exchange of heat with the surroundings of the battery device.

In a possible development of the present invention, the battery housing has at least one cooling fin, in particular an arrangement of a plurality of cooling fins, at a region of the outer wall on the inside of which the heat exchanger is arranged. Such cooling fins can improve the said exchange of heat between the heat exchanger and the surroundings of the battery device. The at least one cooling fin thus represents a particularly simple and effective option of providing additional thermal management capacity for the battery device. The at least one cooling fin can here be fastened, for example, to the outside of the battery housing, for example by being screwed, welded, or adhesively bonded, in particular by means of a thermally conductive adhesive. Likewise, the at least one cooling fin can be formed as an integral constituent part of the battery housing itself. This can enable particularly good exchange of heat between the heat exchanger and the cooling fin. To assist the thermal management capacity, the at least one cooling fin can be manufactured from a thermally conductive material such as, for example, aluminum, copper, or steel, or the like.

In a possible development of the present invention, the heat exchanger has a first connecting pair of fluid connectors for the immersion circuit and a second connecting pair of fluid connectors for connection to an external thermal circuit. The thermal management medium circulating inside the battery device can thus enter the heat exchanger and leave the heat exchanger through the first pair of fluid connectors. In contrast, a thermal medium, for example a water/glycol mixture or the like, circulating in the external thermal circuit, i.e. at least largely outside the battery device, can enter the heat exchanger and leave the heat exchanger through the second connecting pair. The external thermal circuit can, for example, be a thermal circuit of a motor vehicle equipped with the battery device according to the invention to which further components of the motor vehicle likewise are or can be connected for the purpose of thermal management.

In the embodiment proposed here of the present invention, the first connecting pair is fluidically coupled without the use of lines to a region in the battery housing through which the thermal management medium can flow. The first connecting pair can thus be formed by simple openings in the heat exchanger and be connected or the like to the immersion circuit just by means of a coupling clamp or the like. In particular, it can be provided here that the thermal management medium does not need to flow through any dedicated longitudinal line, hose, or the like between the heat exchanger and the battery cells or the thermally conductive elements. As a result, corresponding component and mounting costs can be reduced and a flow resistance of the immersion circuit can be reduced. In addition, the cost and potential for faults for the corresponding seals and/or line guides can thus be reduced.

In the embodiment proposed here of the present invention, it is furthermore provided that the second connecting pair of fluid connectors is arranged on an outer side, facing away from the battery cells, of the heat exchanger or the battery device. The heat exchanger can thus be connected to the external thermal circuit in a particularly simple and easy-to-maintain fashion via the second connecting pair. The fluid connectors of the second connecting pair can be designed, for example, as conventional connection pieces or the like. The connecting pairs here comprise in each case at least one inflow and at least one outflow. The heat exchanger can likewise have further fluid connectors. The inflow of the first connecting pair can in particular open into the inflow or upstream region, mentioned elsewhere, inside the battery housing, whilst the outflow of the first connecting pair can be arranged in particular at the outflow or downstream region, mentioned elsewhere, inside the battery housing, adjoining or opening into said region.

In a further possible embodiment of the present invention, the pump is arranged inside the battery housing, in particular in an internal compartment or subhousing of the battery housing. The pump, in particular its electronics and/or motor, is here accessible from outside the battery housing via an openable cover element of an outer wall of the battery housing. The cover element can, for example, be a covering for an opening or recess of the battery housing which can be taken off, unscrewed, flipped open, pivoted, displaced, or otherwise opened and closed. Likewise, the cover element can be a part of the outer wall of the battery housing which can be appropriately opened and closed. By virtue of the embodiment proposed here of the present invention, a saving can at least partially be made in terms of a separate pump housing, and at the same time ease of maintenance, for example because of it being particularly simple to replace the electronics and/or the drive of the pump, can be achieved or maintained. At the same time, the pump can be protected particularly well from mechanical influences and damage particularly effectively and at no additional cost.

In an alternative development of the present invention, the pump is fastened on an outer side of the battery housing. The pump can here be fastened or held on the battery housing directly or indirectly, for example via a pump housing in which the pump is accommodated and which is itself fastened on the outside of the battery housing. In particular, such a pump housing can be fastened on the outside of the battery housing by means of at least one flange-like fluid connection. Such a flange-like fluid connection can here comprise a conventional round flange but can also have a different shape or a different cross-section. Likewise, at least one, i.e. one, several, or all the fluid connections between the pump or pump housing and the battery housing can be designed as fluidic connection pieces or as plug connections, in particular with in each case at least one radially sealing sealing element such as, for example, an O-ring. By virtue of the direct fluidic fastening to the battery housing, a saving can be made in corresponding lines or fluid guides between the battery housing and the pump and improved robustness, for example particularly reliable leakproofness, can be achieved. In particular, two such flange-like fluid connections can be provided here in order to effect the intake and return of the thermal management medium. The arrangement proposed here of the pump on the outside of the battery housing can enable particularly simple access to the pump. The pump can thus, for example, be accessed particularly simply and hence maintained or exchanged particularly simply.

In a further possible embodiment of the present invention, the battery device has at least one electrical and/or electronic power component which is arranged in the battery housing and around or over which the thermal management medium can likewise flow for the purpose of immersion thermal management. The electrical power component can comprise, for example, power electronics, a voltage transformer, a busbar, a switch, a cell contacting system, a memory chip, a printed circuit board, for example of a microcontroller, a control unit, a battery management system, and/or the like. An advantage of the immersion thermal management proposed here is that such electrical power components of the battery device can thus also be thermally managed particularly simply by the thermal management medium flowing directly around them. This is possible in particular with the same thermal management medium and in the same immersion circuit inside the battery as are also used for the thermal management of the battery cells. Operation of the whole battery device which is particularly robust, efficient, and/or cost-effective from a thermal point of view can thus be enabled particularly economically. This can in addition be effected in a manner which is particularly efficient in terms of structural space because, for example, there is no need to provide a cooling body or the like on the electrical power component, or to seal a region of the subhousing in which the electrical power component is arranged. By virtue of the immersion thermal management of the at least one electrical power component, the latter can be manufactured so that it is, for example, smaller and/or made from a more cost-effective material and/or be operated with a higher load or power.

A further aspect of the present invention is a motor vehicle which has a battery device according to the invention, in particular as a traction battery. The battery device can here thus form or comprise a traction battery of the motor vehicle. The motor vehicle according to the invention can in particular be the motor vehicle mentioned in connection with the battery device according to the invention. Accordingly, the motor vehicle according to the invention can have some or all of the properties and/or features mentioned in connection with the battery device according to the invention. The motor vehicle can thus have, for example, a thermal circuit to which the battery device, in particular its heat exchanger, can be connected.

In a possible development of the present invention, the motor vehicle has an air duct through which ambient air can flow when the motor vehicle is driving and which is aligned with those sections of the thermally conductive elements of the battery device which project from the battery housing. The air duct can be closed or unblocked, for example, by means of an air flap which is controllable or pivotable or displaceable in a controlled fashion. The air flap can have, for example, a plurality of sections or branches, at least one and preferably several or all of which can be separated reversibly from the remainder of the air duct as required by a respective air or mixing flap which can be opened and closed. Such a section or branch of the air duct can, for example, be routed along a heat-generating device of the motor vehicle. Likewise, such a section or branch of the air duct can, for example, be routed along a cooling device of the motor vehicle. The battery device can then be thermally managed particularly effectively by corresponding actuation of the air flap or air flaps by ambient air, heated air, and/or cooled air being conducted through the air duct to the thermally conductive elements. By virtue of the embodiment of the present invention proposed here, the thermal management potential supplied by the thermally conductive elements projecting from the battery housing can be used or utilized particularly effectively and efficiently to thermally manage the battery device.

Further features of the invention are apparent from the claims, drawings, and the description of the drawings. The features and combinations of features mentioned above in the description, and the features and combinations of features shown below in isolation in the description of the drawings and/or in the drawings, can be used not only in the respective described combination but also in other combinations or in isolation without going beyond the scope of the invention.

BRIEF DESCRIPTION OF THE DRAWINGS

Identical and functionally identical elements are provided with the same reference numerals in the drawings. For the sake of clarity, in each case only one representative example of the components which appear multiple times in the individual drawings is explicitly marked.

DETAILED DESCRIPTION OF THE DRAWINGS

Figure 1:
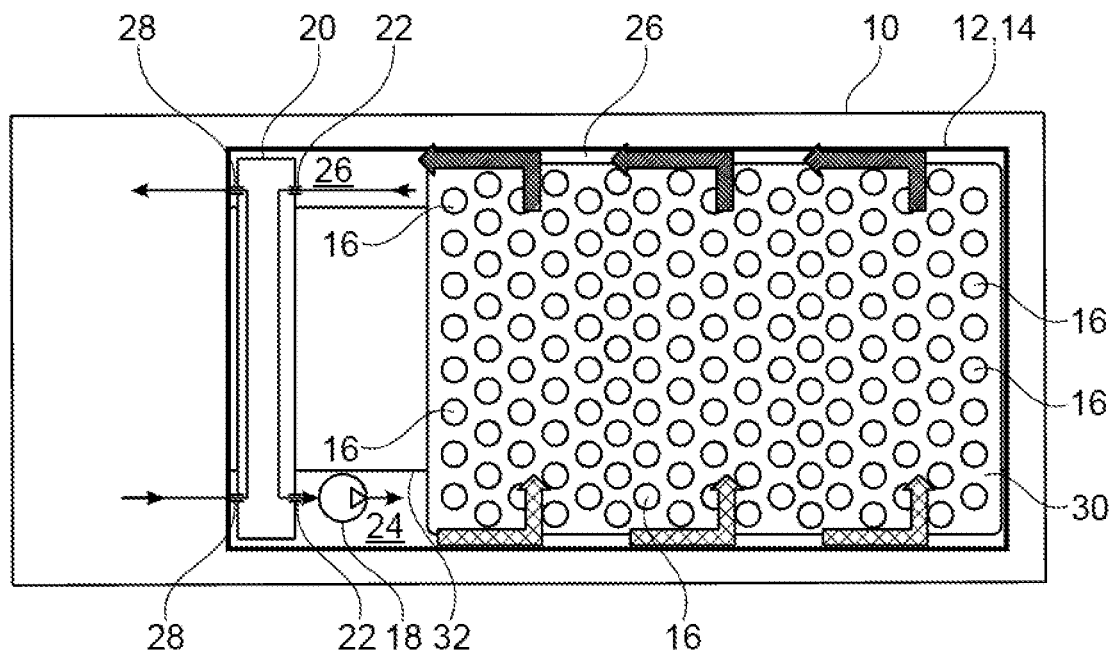
FIG. 1 is a partial schematic view of a motor vehicle with a battery configured for immersion thermal management.

FIG. 1 shows a partial schematic illustration of a motor vehicle 10 which is equipped with a battery device 12. The battery device 12 comprises a battery housing 14 in which all the components of the battery device 12 are here arranged. Multiple individual battery cells 16, a pump 18, and a heat exchanger 20 are thus arranged inside the battery housing 14 in order to implement an immersion circuit inside the battery. For this purpose, the heat exchanger 20 has internal fluid connectors 22 for a dielectric thermal management medium circulating in the immersion circuit inside the battery. The thermal management medium can leave the heat exchanger 20 through one of the internal fluid connectors 22 into an upstream region 24 inside the battery housing 14. The thermal management medium can then flow out of the upstream region 24, along the battery cells 16, for the purpose of heat exchange and then pass into a downstream region 26 inside the battery housing 14. The thermal management medium can then flow out of the downstream region 26 or through this downstream region 26, through the other internal fluid connectors 22, into the heat exchanger 20. The battery cells 16 can be thermally managed by immersion by the thermal management medium thus circulating inside the battery housing 14. The thermal management medium is thus forced, i.e. conveyed, through this internal immersion circuit by means of the pump 18. The thermal management medium can thus likewise flow at least partially or in some regions around the pump 18, for example in order to cool a motor or drive of the pump 18.

The heat exchanger 20 furthermore has external fluid connectors 28 via which it can be connected to a thermal circuit of the vehicle 10 outside the battery. Heat can thus be exchanged in the heat exchanger 20 between the thermal management medium circulating inside the battery and a thermal medium flowing through the thermal circuit outside the battery.

The battery cells 16 are here held by means of a cell holder 30 by means of which flow ducts, routed along the battery cells 16, can be formed for the thermal management medium. In addition, the cell holder 30 can serve as a pressure loss element for setting a flow and hence also a thermal management capacity of the thermal management medium in different regions inside the battery housing 14.

In order to achieve a consistent profile of the flow of the thermal management medium inside the battery housing 14, in the present case a seal 32 is provided by means of which the upstream region 24 and the downstream region 26 are separated from each other.

Figure 2:
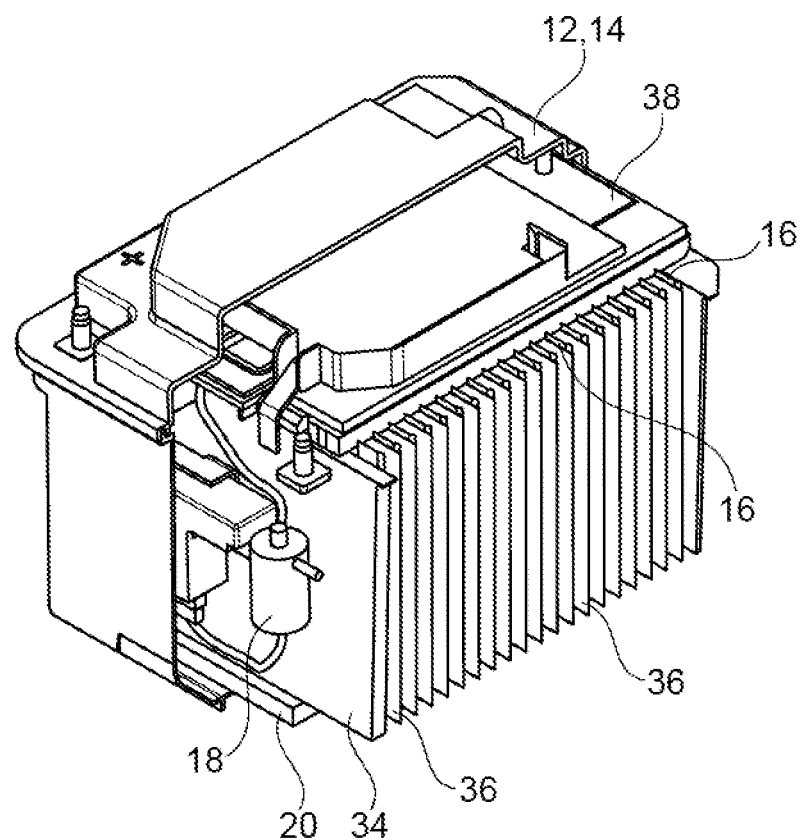
FIG. 2 is a partial schematic view in perspective of a corresponding battery.

The battery device 12 additionally has thermally conductive elements 36 (see FIG. 2) which are arranged between the battery cells 16 and project from the battery housing 14 on at least one side for the purpose of heat transfer (not visible here). By way of illustration, FIG. 2 shows a partial schematic view of the or a corresponding battery device 12. The battery housing 14 is cut away, i.e. only illustrated in part. The battery cells 16 are here designed by way of example as pouch cells which are braced inside the battery housing 14 by means of a plate-like divider 34. One of the thermally conductive elements 36, which projects beyond the battery cells 16 in at least one direction, is here arranged between two adjacent battery cells 16. In this direction or on the corresponding side of the battery cells 16, a spacing can be arranged between the battery cells 16 and a wall, in particular an inner side of an outer wall, of the battery housing through which the thermally conductive elements 36 project in the same manner as the outer wall of the battery housing 14. The thermal management medium can flow around the thermally conductive elements 36 in particular in this region for the purpose of immersion thermal management.

The battery device 12 furthermore here has at least one electrical or electronic power component, referred to here collectively and in simplified form as power electrics 38.

The power electrics 38 can here likewise be thermally managed by immersion, i.e. integrated into the immersion circuit inside the battery and the thermal management medium can flow around them.

The properties and embodiments of the battery device 12 are explained in detail below with reference to the drawings. The battery device 12 has an internal dielectric cooling circuit by means of which the, in particular all the, structural elements or components of the battery device 12 which produce heat during operation can be thermally managed. All the components of the cooling circuit, i.e. of the said immersion circuit inside the battery, are thus arranged in or on the battery housing 14 of the battery device 12. By virtue of this arrangement, on the one hand, the complexity of the thermodynamic fully active immersion circuit can be minimized, for example with respect to a fluid volume of the thermal management medium, a delivery pressure requirement, or the output or size of the pump 18, and/or the like. On the other hand, for example, a functional and geometrical interface, which exists in a conventional vehicle configuration, with the thermal circuit or a vehicle cooling system, for example based on water/glycol, of the motor vehicle 10 and with the vehicle architecture of the motor vehicle 10 can be maintained. The battery device 12 can thus then be designed particularly simply so that it is compatible with existing vehicle architectures for electrical and high-voltage storage means, i.e. batteries, which are not thermally managed by immersion, in particular with those which are conventionally thermally managed with plate heat exchangers through which water/glycol flows and which are in turn, for example, thermally bonded to thermally conductive sheets or battery cells, for example by adhesive bonding means of a thermal adhesive or by means of surface pressure.

In the embodiment of the battery device 12 proposed here, in particular mechanical retaining structures for the battery cells 16 which are known from conventional or prior energy storage means can be maintained, whilst previously used internal closed fluid guides inside and between housing-like individual cell segments or cell modules can be omitted, i.e. a saving can be made in terms of the latter in the battery device 12 described here.

By virtue of the immersion thermal management provided here, improved heat transfer to and from the battery cells 16 can be obtained, for example in comparison with cooling plates or laterally arranged plate coolers often used up until now. As a result, a smaller temperature difference with the thermal management medium, i.e. a higher upstream temperature of the thermal management medium, for example 45° C. or higher, can be used for a predetermined or desired thermal management capacity. This can in turn result in a correspondingly larger temperature difference between the thermal management medium and, for example, the ambient air flowing over those sections of the thermally conductive elements 36 which are outside the housing, and hence enable significantly improved heat dissipation to the ambient air or a corresponding air flow. The battery device 12 proposed here thus enables particularly efficient thermal management at least of the battery cells 16.

By virtue of the thermal management provided or enabled here, not only of the battery cells 16 but also of the power electrics 38, i.e. electrical structural elements such as, for example, power electronics, a voltage converter, a busbar, an electrical line, a switch, a memory chip, a printed circuit board, for example in a control unit, microcontroller, or battery management system of the battery device 12, or the like, by means of the thermal management medium, the described favorable properties and effects of the immersion thermal management assisted by the thermally conductive elements 36 can be applied or used particularly efficiently, in particular at least essentially independently of a cell configuration used. This can be of particular interest, for example, with respect to high current loads in DC/DC converters of battery-powered electric vehicles or fuel cell vehicles or to relatively large quantities of waste heat which occur in high-performance control units or computers, for example in the context of automated vehicles. By virtue of the immersion thermal management proposed here and assisted by the thermally conductive elements 36, of the electrical and/or electronic structural elements or components, the latter can, for example, be subjected to higher loads and/or be implemented with a reduced mass, with a reduced volume, and/or with a reduced cost, for example by using less expensive materials.

The pump 18 is here arranged inside the battery housing 14. The pump 18 can thus be accessed from outside, for example to replace pump machinery of the pump 18, for example via a servicing cover, i.e. a cover element of the battery housing 14 which can be opened and closed. The pump 18 can be accommodated, for example, in a pump housing which can at the same time be a constituent part of the battery housing 14. Likewise, the pump 18 and its pump housing can be fastened to the outside of the battery housing 14 with flange-like fluid connections which engage through an outer wall of the battery housing 14 or can be arranged at corresponding recesses or fluid connectors in the outer wall of the battery housing 14.

Outflow protection, for example in the form of a sliding sleeve, can be provided for the pump 18, between pump machinery, i.e. the motor or drive, of the pump 18 and fluid attachments or fluid openings for the thermal management medium which are arranged in or on the battery housing 14 or the outer wall of the battery housing 14. Additionally or alternatively, outflow protection in the form of an outflow protection hood can be provided between the fluid connections in the pump housing or in the outer wall of the battery housing 14 and a housing interior of the battery housing 14 through which the thermal management medium can flow.

Likewise, the pump 18 can, in particular when arranged on the outside of the battery housing 14, be integrated into the immersion circuit of the battery device 12 by means of a line loop. The pump 18 can thus be designed, for example, as a so-called in-line pump.

By virtue of the different embodiments proposed here, the battery device 12 can also be adapted, for increased space requirements for the battery housing 14 in confined installation situations, to make the pump 18 accessible for servicing or maintenance purposes or to replace the battery device 12 and/or to make it possible to combine the latter to form or with modular arrangements.

As described for the pump 18, the heat exchanger 20 can also, as illustrated here, be arranged inside the battery housing 14 on the outside of the battery housing 14. The requirements for the battery device 12 mentioned in connection with the pump 18 can also be met as a result.

In particular, a cooling air flow, which can for example be guided inside an air duct of the motor vehicle 10, can be applied to at least part of the battery device 12. The cooling air flow can use or comprise, for example, ambient air from the surroundings of the motor vehicle 10 as the heat-carrying fluid. The cooling air flow can thus be applied, for example, to those sections of the thermally conductive elements 36 which project from the battery housing 14, or it can be applied to them by virtue of their arrangement in or on the corresponding air duct. Similarly, thermally conductive elements of the heat exchanger, i.e. cooling fins arranged or formed on the heat exchanger 20, can be provided. In the case of an arrangement of the heat exchanger 20 inside the battery housing 14, they can project or engage through an outer wall, i.e. an outer housing wall, or the battery housing 14 such that the cooling air flow can be applied to them. Additionally or alternatively, cooling fins or rib-like thermally conductive sheets can be arranged outside the battery housing 14 and be thermally attached thereto, in particular in the region of the heat exchanger 20. As a result, the said favorable properties of the battery device 12 can also be achieved, improved, or assisted, i.e. the said requirements fulfilled.

The embodiments or principles described can be applied for batteries of different types and embodiments. Thus, prismatic cells, pouch cells, horizontally or vertically arranged cylindrical round cells, solid state cells (ASSB, all solid-state batteries), and special forms or cell developments and cell arrangements can be used, for example, as the battery cells 16. Likewise, the battery device 12 described or a correspondingly configured battery device 12 can be used not just for or in the motor vehicle 12. Rather, the battery device 12 can also be used for other use cases, for example as a stationary energy storage means for operating a machine or equipment or as a buffer for a power or energy grid or the like.

As a whole, the examples described show how an electrical storage means with an internal immersion cooling circuit and a conventional heat sink can be implemented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 motor vehicle
12 battery device
14 battery housing
16 battery cells
18 pump
20 heat exchanger
22 internal fluid connectors
24 upstream region
26 downstream region
28 external fluid connectors
30 cell holder
32 seal
34 divider
36 thermally conductive elements
38 power electrics

What is claimed is:

1. A battery device, comprising:
a battery housing;
a plurality of battery cells arranged in the battery housing, around which a dielectric thermal management medium is flowable in the battery housing at least in some areas in an immersion circuit inside the battery for immersion thermal management; and
thermally conductive elements, which are each arranged between two adjacent battery cells that each bear with at least one side against a respective thermally conductive element in thermally conductive contact, wherein
the thermally conductive elements project in at least one direction beyond the battery cells and through a housing wall of the battery housing to the outside, and
the thermal management medium is also flowable around those sections of the thermally conductive elements extending from the battery cells to the housing wall.

2. The battery device according to claim 1, further comprising:
a heat exchanger through which the thermal management medium is flowable; and
a pump for conveying the thermal management medium through the immersion circuit,
wherein the heat exchanger, the pump, and the battery housing form a compact unit.

3. The battery device according to claim 2, wherein
the heat exchanger is arranged inside the battery housing on an inner side of an outer wall of the battery housing.

4. The battery device according to claim 3, wherein
the battery housing has at least one cooling fin at a region of the outer wall on the inside of which the heat exchanger is arranged.

5. The battery device according to claim 2, wherein
the heat exchanger has a first connecting pair of fluid connectors for the immersion circuit and a second connecting pair of fluid connectors for connection to an external thermal circuit,
the first connecting pair is fluidically coupled without use of lines to a region in the battery housing through which the thermal management medium can flow, and
the second connecting pair is arranged on an outer side, facing away from the battery cells, of the heat exchanger.

6. The battery device according to one of claim 2, wherein
the pump is arranged in an internal compartment of the battery housing, and
the pump is accessible from outside the battery housing via an openable cover element of an outer wall of the battery housing.

7. The battery device according to one of claim 2, wherein
the pump is fastened in a pump housing which is fastened on the outside of the battery housing by way of a flange-shaped fluid connection and/or a fluidic connection piece.

8. The battery device according to claim 1, further comprising:
at least one electrical power component, which is arranged in the battery housing and around which the thermal management medium is also flowable for purposes of the immersion thermal management.

9. A motor vehicle comprising a battery device according to claim 1.

10. The motor vehicle according to claim 9, wherein
the motor vehicle has an air duct through which ambient air flows when the motor vehicle is driving, and
the air duct is aligned with those sections of the thermally conductive elements which project from the battery housing.

* * * * *